United States Patent [19]

Rattunde

[11] 4,403,975
[45] Sep. 13, 1983

[54] CONE-PULLEY BELT-TYPE TRANSMISSION

[75] Inventor: Manfred Rattunde, Bad Homburg, Fed. Rep. of Germany

[73] Assignee: P.I.V. Antrieb Werner Reimers GmbH & Co. KG., Bad Homburg, Fed. Rep. of Germany

[21] Appl. No.: 202,420

[22] Filed: Oct. 30, 1980

[30] Foreign Application Priority Data

Nov. 16, 1979 [DE] Fed. Rep. of Germany ....... 2946295

[51] Int. Cl.$^3$ ........................ F16H 11/02; F16H 9/18
[52] U.S. Cl. ......................................... 474/18; 474/28
[58] Field of Search ....................... 474/11, 12, 17, 18, 474/23, 28, 29, 30

[56] References Cited

U.S. PATENT DOCUMENTS

| | | | |
|---|---|---|---|
| 2,035,402 | 3/1936 | Perry | 474/18 |
| 2,346,047 | 4/1944 | Otto | 474/18 |
| 2,350,913 | 6/1944 | Mercer | 474/18 |
| 3,200,666 | 8/1965 | Schrodt et al. | 474/18 |
| 3,451,283 | 6/1969 | Rattunde | 474/18 |
| 3,918,312 | 11/1975 | Espenschied et al. | 474/18 |
| 4,174,641 | 11/1979 | Hillman | 474/18 |

FOREIGN PATENT DOCUMENTS 560337  3/1975  Switzerland ........................ 474/28

*Primary Examiner*—Lawrence J. Staab
*Attorney, Agent, or Firm*—Spencer & Kaye

[57] ABSTRACT

In an infinitely variable cone pulley transmission having a driving shaft connected to a source of driving power, a driven shaft, a pair of conical discs nonrotatably mounted on each shaft with at least one disc of each pair being axially displaceable on its associated shaft, an endless transmission element adapted to run between the two pairs of discs for transmitting power between the shafts, a cylinder-piston unit associated with one axially displaceable disc on each pair for urging that disc toward the other disc of the same pair with a force proportional to the pressure of fluid in the unit, a distributing valve arranged to be arbitrarily adjusted to vary the speed ratio of the transmission, and connected to a pressure fluid source and to each unit for supplying pressure fluid thereto, and a normally-closed control valve connected in fluid flow communication with the distributing valve for controlling the fluid pressure in the unit associated with the driven shaft, the closing force presented by the control valve is controlled by an electromagnetic actuator having an energizing winding and connected to cause the closing force presented by the control valve to be proportional to the current through the winding, and an element connected to supply the winding with a current proportional to the torque being transmitted by the transmission, whereby the closing force presented by the control valve to fluid in the unit associated with the driven shaft is proportional to the torque.

6 Claims, 4 Drawing Figures

CONE-PULLEY BELT-TYPE TRANSMISSION

BACKGROUND OF THE INVENTION

The present invention relates to an infinitely variable cone-pulley belt-type transmission of the type having a drive-input shaft connected with the drive motor and a drive-output shaft, a respective pair of cone-pulleys arranged on each shaft, with one pulley of each pair being axially displaceable, and at least one endless transmission element running between two pulley pairs to transmit power therebetween. One axially displaceable cone-pulley of each pair cooperates with a piston fast with the associated shaft to form a cylinder-piston unit to which pressure medium supplied by a pump is distributed by way of a four-edged distributing slide valve for the setting and maintenance of the transmission ratio. The slide valve, on the one hand, acts on an axially movable cone-pulley and, on the other hand, is displaceable by the action of a control member. A biassed pressure relief control valve is connected in the path of outflow from the distributing valve for setting the pressure prevailing at the drive-output side of the transmission.

Such a transmission is disclosed in U.S. Pat. No. 3,451,283. There the biassed control valve is controlled by the pressure-medium pressure prevailing on the drive-input side of the transmission, so that in relation to a specific transmission ratio a torque-dependent control of the pressure-medium pressure on the drive-output side results.

If at this determined transmission ratio the torque to be conducted by the transmission should vary, this leads by way of the four-edged distributing slide valve finally to a corresponding modification of the pressure-medium pressure on the drive-input side, and thus by way of the control valve to a corresponding variation of the pressure-medium pressure on the drive-output side.

Now, however, this torque-dependent control system is affected by considerable inertia, since the adaptation to a modified torque can only take place by an adjusting operation initially involved therewith on one of the axially displaceable cone pulleys and takes effect upon the distributing slide valve. This leads to a resetting operation on the axially displaceable cone-pulley on the drive-input side, as a result of variation of the pressure-medium pressure prevailing there, only after which an adaptation of the pressure-medium pressure prevailing on the drive-output side can take place by the action of the modified pressure-medium pressure at the drive-input side upon the control valve. This behavior is especially disadvantageous in the case of torque surges such as occur especially in starting up, in gear change operations, etc.

SUMMARY OF THE INVENTION

It is an object of the present invention to attain a more rapid reaction of such a transmission to variations of the torque to be transmitted.

A related object of the invention is to make the reaction, in relation to the pressure-medium pressure on the drive-output side, independent of the pressure-medium pressure on the drive-input side. A further object is to achieve the desired results without significantly increasing the fabrication costs for the transmission.

These and other objects are achieved, according to the invention by controlling the control valve by an electromagnetic actuator having an actuating winding connected to receive a current proportional to the torque being transmitted by the transmission, in such a way that as the torque increases, the throttling effect of the control valve rises.

When a transmission is constructed according to the invention, the control valve closing force is immediately influenced by a variation of the torque to be transmitted by the transmission, irrespective of the manner of operation of the distribution slide valve, so that a likewise immediate influencing of the pressure-medium pressure on the drive-output side results, while the corresponding variation of the pressure-medium pressure on the drive-input side is effected in known manner likewise directly by the action of one of the axially displaceable cone-pulleys upon the position of the distribution slide valve. Thus, especially in comparison with the known transmission, the occurrence, upon a variation of torque, of an adjusting operation which oscillates to the final state, even though aperiodically, is also prevented.

In the case where the drive is effected by an electric motor, it is expedient for the winding of the electromagnetic actuator to be connected to one phase of the current fed to the motor, in parallel with the latter. If for example due to an increase in torque the drive motor consumes more current, this then also leads to an increased flow of current through the actuating winding and correspondingly to a reinforcement of the throttling effect produced by the control valve.

In embodiments of this type, it is advantageous to derive an input signal for the actuating winding by means of electronic components which operate to derive from the motor input voltage and current a signal representative of the mechanical torque being transmitted.

Another possibility according to the invention consists in arranging a torque measuring member on one of the transmission shafts and in passing the signal produced by the torque-measuring member by way of a repeater to the actuator winding. Such a form of construction is also suitable for systems driven, for example, by an internal combustion engine. Torque-measuring members delivering an electric signal are known per se and therefore so not need to be described in greater detail here.

Finally it is advantageous for the control valve to be formed as a differential valve with its adjustment, or setting, value influenced by the hydraulic pressure on the drive-output side. In this way the dimensioning of the winding can be influenced favorably in the sense of giving it small dimensions.

DESCRIPTION OF THE PREFERRED EMBODIMENTS

Figure 1:
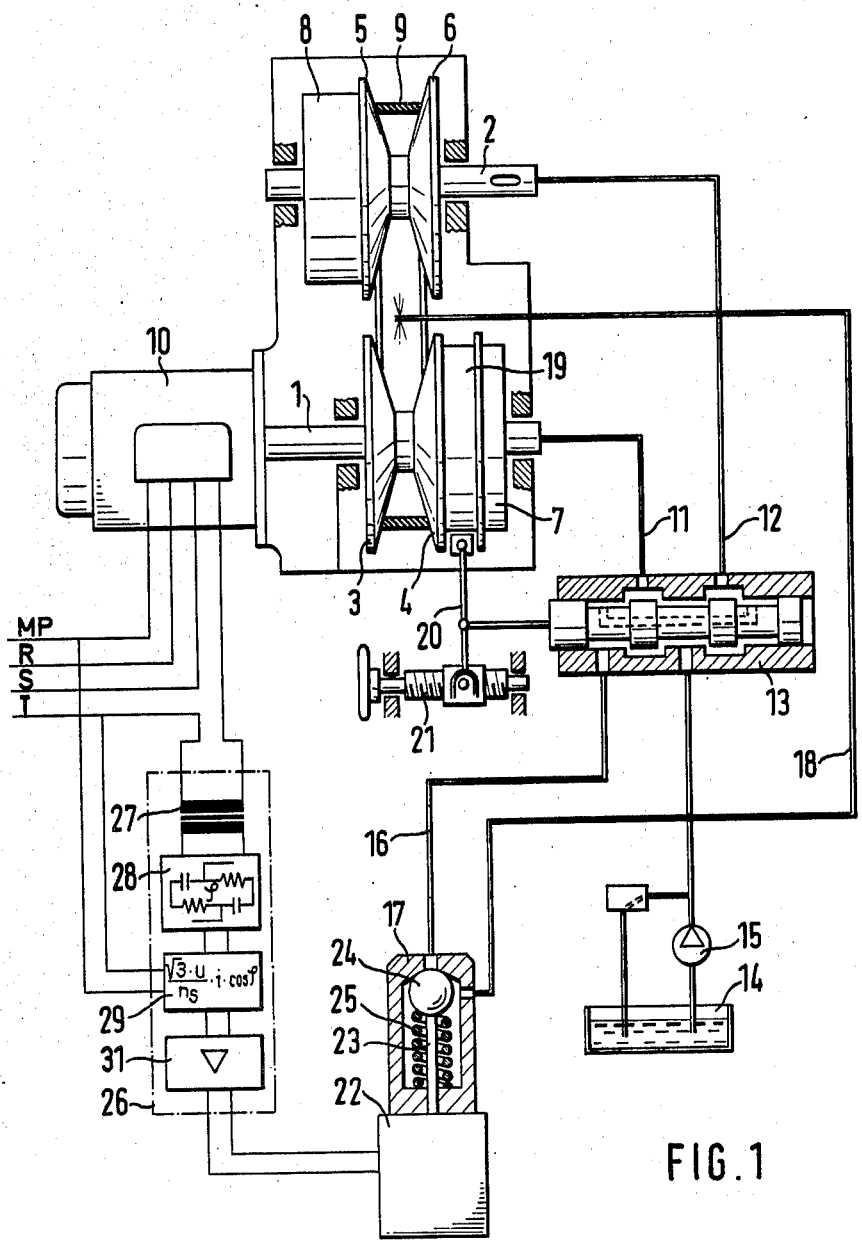
FIG. 1 is an elevational view, partly schematic and partly in cross section, of a hydraulically controlled cone-pulley belt-type transmission with drive motor and a first embodiment of a control valve system according to the invention.

FIG. 1 shows an infinitely variable, fully hydraulically settable cone-pulley belt-type transmission having a drive-input shaft 1 and a drive-output shaft 2 on which pairs of cone-pulleys 3 and 4 or 5 and 6 are arranged, of which the cone-pulleys 4 and 5 are axially displaceable and form, together with a respective piston (not shown) fast with the associated shaft, cylinder-piston units 7 and 8. An endless transmission element 9 circulates between the cone-pulleys.

An electric motor 10 is connected to supply driving power to the drive-input shaft 1.

Pressure medium is distributed to the cylinder-piston units 7 and 8 through conduits 11 and 12 from a four-edged distributing slide valve 13, the medium being delivered to this valve from an oil reservoir 14 by a pump 15. From the four-edged slide valve 13 pressure medium flows at the pressure-medium pressure prevailing on the drive-output side, through a conduit 16 to a biassed control valve 17 and from there it flows through a conduit 18 to serve for lubrication of the element 9 and then returns to the reservoir 14.

The cone-pulley 4 is adjoined by an annular groove 19 in which a setting lever 20 is guided via a slide block at one end of the lever. A member 21 acts on the other end of the setting lever 20 for manually setting and varying the transmission ratio. At a location between its two ends, the setting lever 20 is connected to the valve member, or spindle, of valve 13.

The setting of control valve 17 is effected by means of a plunger coil 22 which in the case illustrated has an output member 23 connected to the plunger winding and pressing upon a ball 24 with a force proportional to the torque transmitted by the transmission. A spring 25 serves to generate a specific basic force upon the ball 24.

The plunger coil is energized by being connected in parallel to the current supply of the electric motor 10, and a higher current flows through the plunger winding of the plunger coil when the electric motor 10 also receives a higher current as a result of increase in the torque imposed on the transmission.

The plunger coil is preceded by a device 26 of electronic components, in the present case included a current converter, a transformer 27, a phase bridge 28, a multiplier unit 29 and an amplifier 31. The device 26 serves essentially to provide a representation of the actual valve of the mechanical torque $M_d$ according to the equation $M_d = \sqrt{3}.U.I. \cos \phi/n$, where n is equal to the motor rotational speed and $\phi$ is the phase of current I relative to voltage U. A signal representative of the voltage U between phase input T and common line MP is supplied to unit 29.

The momentary motor load serves as measure for the respective torque. This motor load, in turn, is characterized by the phase shift between motor voltage and motor current, whereby the cosine of the phase angle $\phi$ runs approximately proportional to the load. Phase detector 28 interprets this connection in such a way that it supplies an output signal proportional to cosine $\phi$.

On variation of the torque, moreover, in a known manner an adaption of the hydraulic pressure on the drive-input side takes place in that the cone-pulley 4 is displaced correspondingly somewhat to the right or left, which leads via lever 20 to a corresponding displacement of the movable member of valve 13 and then to establishment at the drive-input side of the hydraulic pressure valve corresponding to the modified torque.

Figure 2:
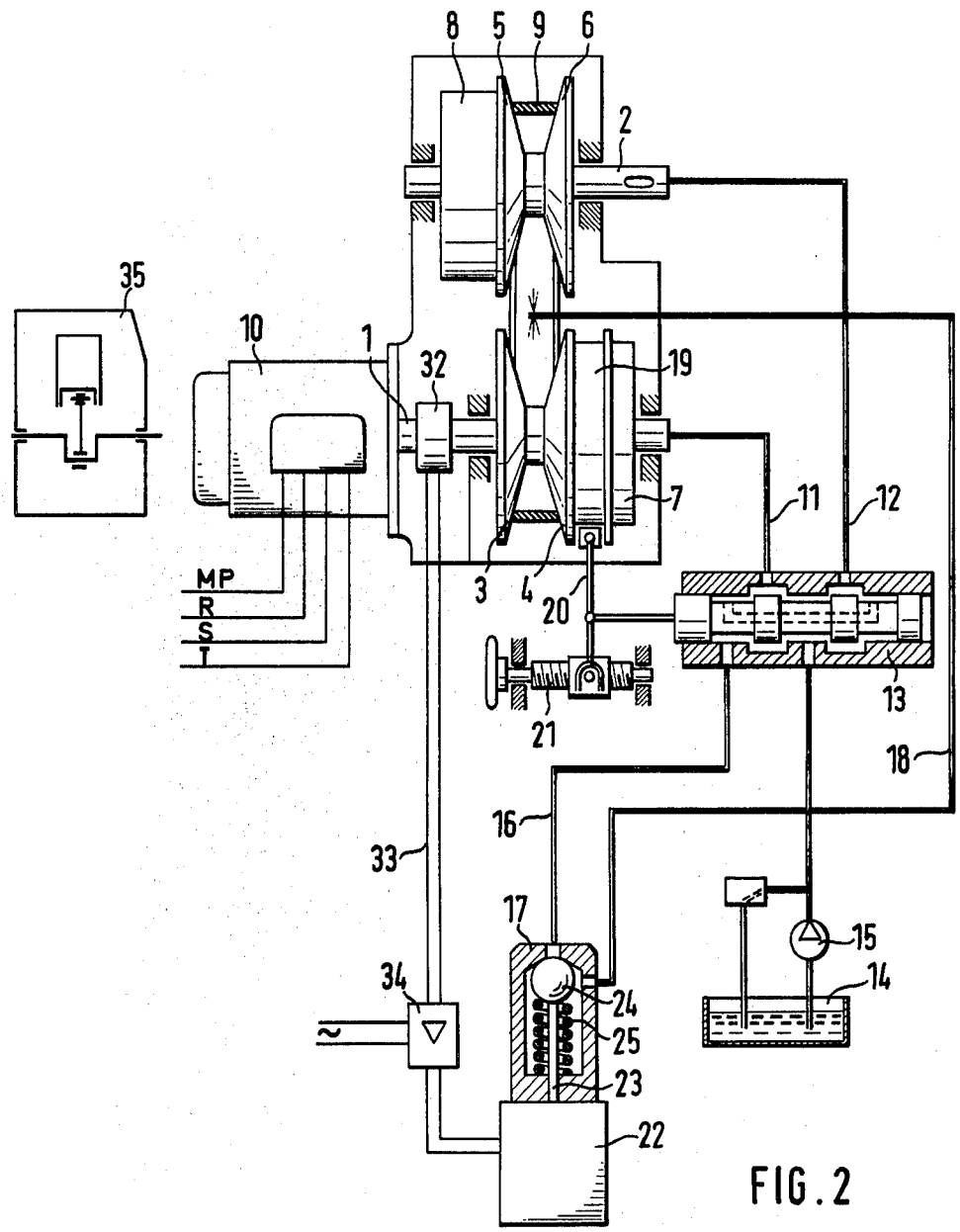
FIG. 2 is a view similar to that of FIG. 1 of a second embodiment of such a system according to the invention.

FIG. 2 shows fundamentally the transmission assembly according to FIG. 1, and the identical components will not be described again.

This embodiment differs in that a torque sensor 32 is mounted on shaft 1 to deliver a signal corresponding to the torque transmitted in each case by way of a lead 33 and an amplifier 34 to the plunger coil 22.

Torque sensor 32 is, in this case, a facility for producing a torque-proportional electric signal, for instance a torque meter. Strain gauges, pasted onto a shaft under torsional stress, experience a resistance variation running proportional to the torsion. These electric resistance variations are converted—amplified—into analogous control signals and transferred onto plunger coil 22.

It will be appreciated that this embodiment is also suitable for drive by an internal combustion engine 35, which is illustrated as alternative, since the drive energy for such an engine is not monitored by such a sensor.

Figure 3:
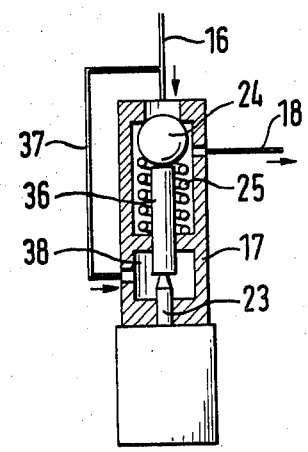
FIGS. 3 and 4 are cross-sectional detail views of two further embodiments of control valve system according to the invention.
Figure 4:
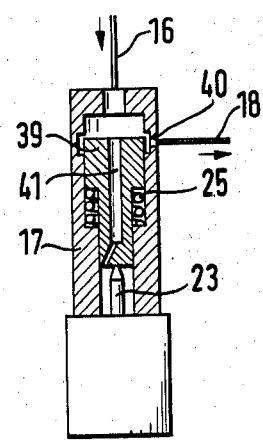

FIGS. 3 and 4 show embodiments of the control valve 17 as a differential valve to act against the setting force exerted by the member 23.

For this purpose, according to FIG. 3, between the actuating member 23 of the plunger coil and the valve ball 24, a valve plunger 36 is inserted and is loaded from behind via a conduit 37 and a separate pressure chamber 38 with the pressure medium coming from the valve 13 at the pressure prevailing upon the drive-output side of the transmission.

In FIG. 4, the control valve is constituted by a slide valve 39 of piston form which forms a control edge with an outflow opening 40 in the associated housing. The control piston 39 is provided with an axial bore which causes it to be loaded additionally from the rear, on its smaller piston area, with the pressure prevailing on the drive-output side of the transmission.

In practical embodiments of the invention, the signal applied to actuator 22 will be selected to produce a force comparable to that produced by the piston of the control valve in U.S. Pat. No. 3,451,283. Of course, in the operation of the invention, the proper closing force for valve member 24 is reached much more rapidly subsequent to occurrence of a change in torque.

Valves according to FIGS. 3 and 4 have the advantage over the one in FIG. 1 inasmuch as the required controlling torque of the plunger coil can be minimized through differentail action. This is effected by choosing the zone upon which the infeed pressure is acting via circuit 16 and the compensating zone opposite. The necessary constructional elaborateness of a plunger coil decreases over-proportionately with descending adjusting power.

It will be understood that the above description of the present invention is susceptible to various modifications, changes and adaptations, and the same are intended to be comprehended within the meaning and range of equivalents of the appended claims.

What is claimed is:

1. In an infinitely variable cone pulley transmission having a driving shaft connected to a source of driving power, a driven shaft, a pair of conical discs nonrotatably mounted on each shaft with at least one disc of each pair being axially displaceable on its associated shaft, an endless transmission element connecting and adapted to run between the two pairs of discs for transmitting power between the shafts, means defining a cylinder-piston unit associated with one axially displaceable disc of each pair for urging that disc toward the other disc of the same pair with a force proportional to the pressure of fluid in the unit, supply means of a pressure fluid, a distributing valve connected to act on the movable disc of one pair and additionally arranged to be arbitrarily adjusted to vary the speed ratio of the transmission, a line connecting the supply means to the distributing valve and conducting means connecting the distributing valve to each cylinder-piston unit for supplying pressure fluid thereto, and a normally-closed control valve connected in fluid flow communication with the distributing valve for controlling the fluid pressure in the cylinder-piston unit associated with the driven shaft, the control valve including means for controlling its closing force, the improvement wherein said closing force controlling means comprise: an electro-magnetic actuator having an energizing winding and connected to cause the closing force presented by said control valve to be proportional to the current through said winding; and means connected to supply said winding with a current proportional to the torque being transmitted by said transmission, whereby the closing force presented by said control valve to fluid in said cylinder-piston unit associated with said driven shaft is proportional to the torque.

2. An arrangement as defined in claim 1 wherein the source of driving power is a multiphase electric motor and said means connected to supply said winding is connected to one phase input of the motor and is parallel with the motor.

3. An arrangement as defined in claim 2 wherein said means connected to supply said winding comprise electronic components connected for deriving a signal representative of the torque and proportional to $\sqrt{3} \cdot U \cdot I \cdot \cos \phi / n$, where U and I are the voltage and current to the one phase input, $\phi$ is the current phase angle, and n is the rotational speed.

4. An arrangement as defined in claim 1 wherein said means connected to supply said winding comprise a torque transducer mounted on one of said shafts for producing an output signal proportional to the torque on that shaft.

5. An arrangement as defined in claim 1 wherein said control valve is a differential valve constructed to cause the fluid pressure in the cylinder-piston unit associated with the driven shaft to contribute to the closing force presented by said valve.

6. An arrangement as defined in claim 1 wherein said means connected to supply said winding operate independently of the fluid pressure in the cylinder-piston unit associated with the driving shaft.

* * * * *